Figure 1:
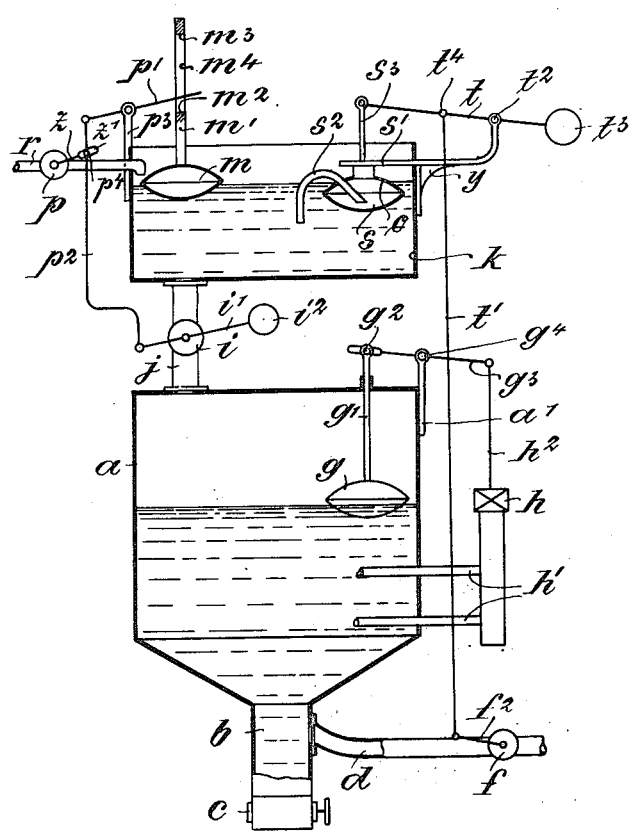

E. CLAUSSEN.
APPARATUS FOR PURIFYING WATER.
APPLICATION FILED JAN. 30, 1915.

1,173,709.

Patented Feb. 29, 1916.
4 SHEETS—SHEET 1.

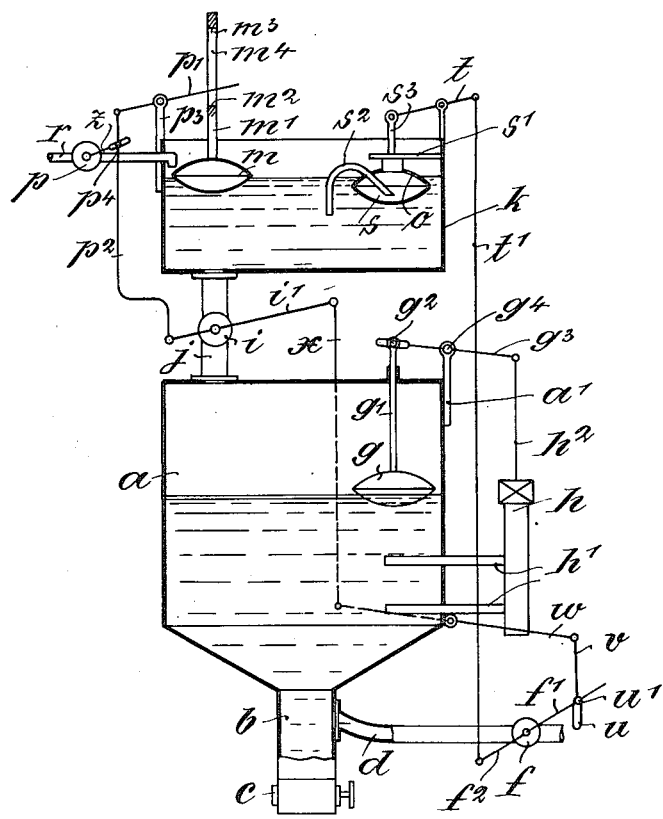

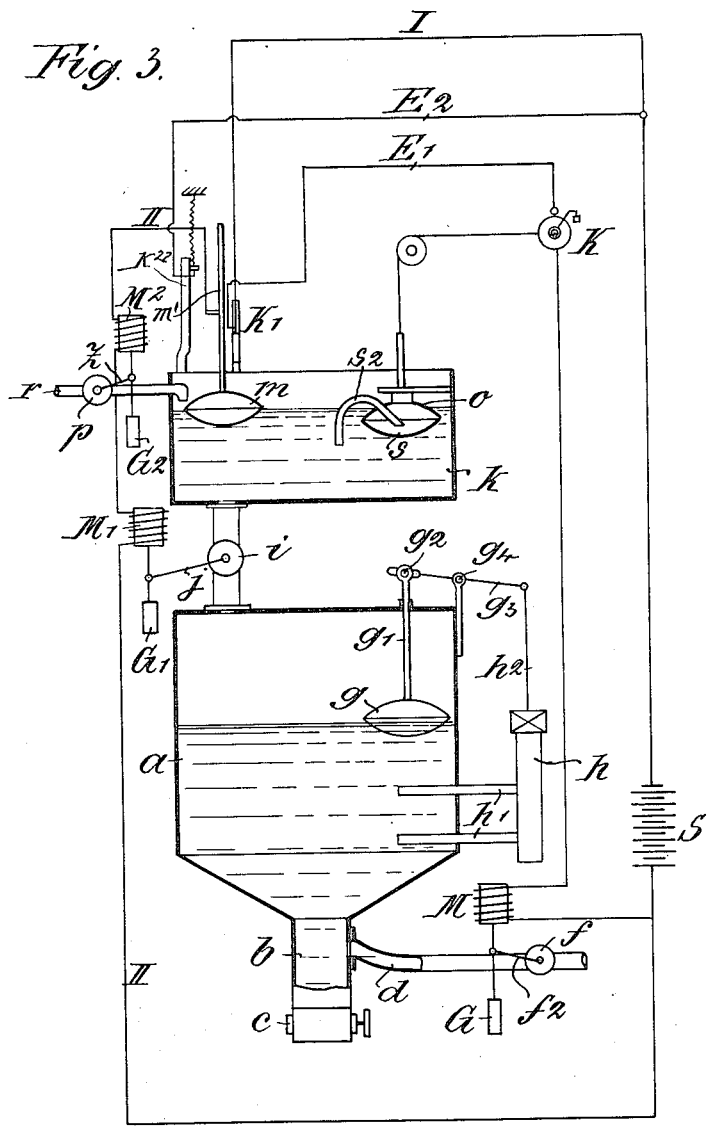

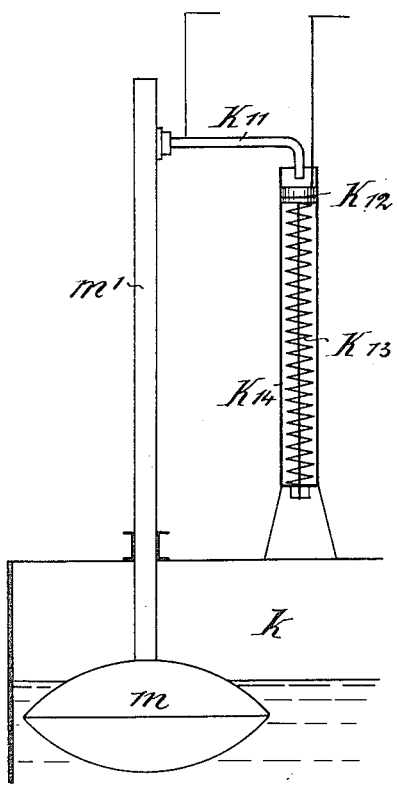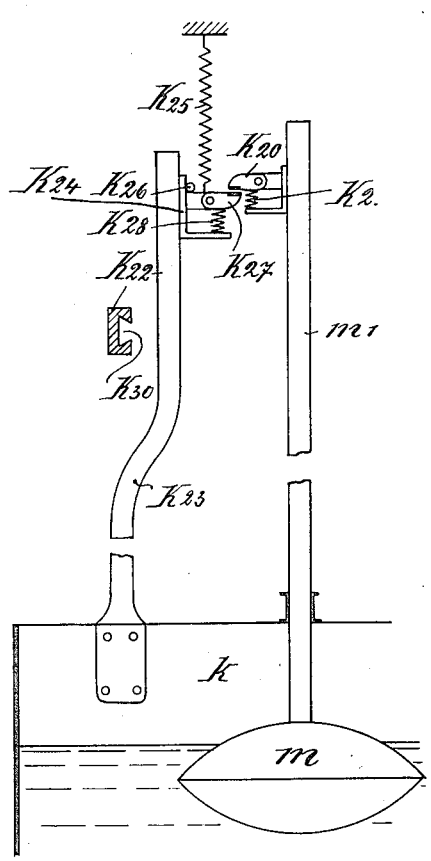

UNITED STATES PATENT OFFICE.

ERNST CLAUSSEN, OF HAGEN, GERMANY.

APPARATUS FOR PURIFYING WATER.

1,173,709.

Specification of Letters Patent.

Patented Feb. 29, 1916.

Application filed January 30, 1915. Serial No. 5,295.

*To all whom it may concern:*

Be it known that I, ERNST CLAUSSEN, subject of the German Empire, residing at Hagen, Province of Westphalia, Germany, have invented certain new and useful Improvements in Apparatus for Purifying Water, of which the following is a specification.

This invention relates to improvements in apparatus for purifying water consisting of an upper and a lower watertank connected by a pipe with means for opening and interrupting the connection between both tanks. This means preferably consists of a cock which is operated by a float and preferably the same float regulates the entrance of the untreated water into the upper tank. Another float operates a valve or the like controlling discharge of water from the lower tank and a third float rising and sinking with the level of the water in the lower tank regulates the flow of steam by which the contents of the lower tank is heated.

The main feature of the invention consists in providing means that limit upward movement of the float that regulates the outlet from the lower tank before the water in the upper tank reaches its highest level, and arranging an opening in the body of said float so that as the latter fills with water entering through said opening, it will sink and actuate the valve connected therewith.

The float that controls the outlet from the lower tank is provided with means for emptying it, such means preferably consisting of a siphon. After the siphon or other equivalent has emptied the float it suddenly rises by means of a counter weight until it is arrested by the aforesaid means limiting upward movement thereof.

In the accompanying drawing:—Figure 1 is a more or less diagrammatic sectional view of an embodiment of the invention; Fig. 2 is a similar view of a modification; Fig. 3 illustrates a further modification in which the valves are electrically operated, and Figs. 4 and 5 are details of the structure illustrated in Fig. 3.

$k$ in Fig. 1 is the upper tank, $a$ the lower tank, $j$ the connecting pipe between the tanks containing a cock or valve $i$. The cock or valve $i$ is actuated by a lever $i^1$ provided with a counter-weight $i^2$, and a rod $p^2$ connects the lever $i^1$ to a lever $p^1$ that is fulcrumed on an upright $p^3$ on the tank $k$. The free arm of the lever $p^1$ penetrates a slot $m^4$ formed in the stem $m^1$ of a float $m$. $r$ is a pipe through which, when the cock or valve $p$ is opened, water enters the upper tank $k$. The cock $p$ is provided with an arm $z$ having a slot $z^1$ that receives a pin $p^4$ on the rod $p^2$. The lower edge of the slot in the valve stem $m^1$ is indicated by the numeral $m^2$ and the upper edge by the numeral $m^3$. A bracket $y$ bears a stop $s^1$ and the fulcrum $t^2$ of a lever $t$ having a counter-weight $t^3$. The lever $t$ is connected with the stem $s^3$ of a float $s$ in the upper side of which there is an opening $o$ and which is provided with a siphon $s^2$. The lever $t$ is at $t^4$ pivotally connected with a rod $t^1$ that at its lower end is pivotally connected with the arm $f^2$ of a valve or cock $f$ in the outlet tube $d$ of the lower tank $a$. $c$ is a cock or valve for letting out the mud and is situated in a special part $b$ of the tank $a$. In the tank $a$ a float $g$ is situated, the stem $g^1$ of which is, by means of a pin and slot arrangement $g^2$, connected with a lever $g^3$, the fulcrum $g^4$ of which lies on an arm $a^1$. The lever $g^3$ is pivotally connected with a rod $h^2$ that enters a tube $h$ and controls the supply of steam or other heating means to the pipes $h^1$ which lead into the lower tank $a$. It is evident that instead of introducing steam for heating purposes other equivalent means may be used, for instance an electric arrangement in which latter case the rod $h^2$ when moved would shift the contacts.

Under the conditions shown in Fig. 1 the float $s$ has been arrested by the lug $s^1$ cock $p$ is still open and water enters through pipe $r$ into the tank $k$ so that the level of the water is still rising. At this time the valve $i^1$ is closed and the valve $f$ in the discharge pipe $d$ is open. When the surface of the water in tank $k$ reaches the opening $o$ of the float $s$ the latter fills up and suddenly sinks thereby, by means of lever $t$, rod $t^1$ and arm $f^2$, very rapidly closing the cock $f$ of the outlet pipe $d$. The level of the water continues to rise in tank $k$ and finally brings the float $m$ into its highest position in which the edge $m^2$ of slot $m^4$ turns lever $p^1$ thereby moving arm $z$ and closing cock $p$ so that the influx of water to the tank $k$ is interrupted. The same movement of lever $p^1$ turns, by means of rod $p^2$, the lever $i^1$ of the cock $i$, opening the latter and the water contained in tank $k$ flows through pipe $j$ into the lower tank $a$.

Here the water receives the chemicals necessary for purifying or softening it. The level of the water in tank $k$ sinks and the level of the water in tank $a$ rises. Thereby the float $m$ sinks down until the edge $m^3$ of the slot $m^4$ turns the lever $p^1$ closing the cock $i$ in the pipe $j$ and opening the cock $p$ in the supply pipe $r$ so that water again enters the tank $k$. When the level of the water in tank $k$ has sufficiently sunk down the siphon $s^2$ or an equivalent means, for instance a valve with a stem adapted to strike against the bottom of the tank $k$ empties the float $s$ and the latter is very rapidly lifted up by the counterweight $t^3$ and through lever $t$, rod $t^1$ and arm $f^2$ opens the cock $f$. The pipe $d$ remains open until the float $s$ after having been arrested by the lug $s^1$ again is filled up with water entering through the opening $o$. The float $g$ rises with the water in the tank $a$ and sinks with it, the rising movement letting steam enter through the pipes $h^1$ in order to heat the water in the tank $a$ and the sinking movement cutting off the influx of the steam. After the cock $p$ has been opened the water in tank $k$ rises and lifts the float $m$, and the play described above begins again.

As to the modification shown in Fig. 2 like numerals signify like structural parts as in Fig. 1. The main difference with respect to the construction shown in Fig. 1 of the drawings consists in that in the modification the float $s$ when sinking after having been filled through the opening $e$ instead of closing the outlet cock $f$ opens it while the latter is closed by means of the float $m$. This has the advantage that the rod $t^1$ is only drawn and is not objectionably influenced by vibrations. The lever $i^1$ of the connection cock $i$ in the pipe $j$ is, by means of a rod or a chain, connected with a lever $w$ the fulcrum of which is situated on the tank $a$. The lever $w$ is pivotally connected with a rod $v$ having a slot $u$ playing over a pin $u^1$ on the arm $f^1$ of a lever $f^1$, $f^2$. When the float $s$, after having been filled with water through the opening $o$, very rapidly sinks it opens, by means of lever $t$, rod $t^1$ and arm $f^2$, the outlet cock $f$. The level of water in the tank $k$ continues to rise until the float $m$ reaches its highest position, when, by the edge $m^2$ abutting against the lever $p^1$, the inlet cock $p$ is closed and the communication cock $i$ in the pipe $j$ is opened. In the interval between the sinking of the float $s$ and the float $m$ reaching its highest position the contents of tank $a$ will have been discharged through the open tube $d$. When cock $p$ is closed and cock $i$ opened the cock $f$ by means of the connections $i^1$, $w$, $v$, $u$, $u^1$, $f^1$ is closed. Water flows from tank $k$ in to tank $a$, the float $g$ rises, steam enters through the pipes $h^1$ into the rising water in tank $a$. When the float $m$ has reached its lowest position it opens the cock $p$, by the edge $m^3$ abutting against the lever $p^1$, and closes the cock $i$. In the meantime the float $s$ has been emptied by the siphon, and when it is again filled by the water rising in the tank $k$ it sinks and opens the cock $f$. The water flows out of the tank $a$, the float $g$ sinks and cuts off the steam through the tubes $h^1$. Then the same play begins again.

In Figs. 3–5 an embodiment of the invention is shown in which the functions are regulated electrically in connection with the floats $m$ and $s$ while the float $g$ works as described above. Fig. 3 shows the electric contacts only diagrammatically, a constructional embodiment being given in Figs. 4 and 5. S represents a suitable source of electric energy, for instance, an electric battery. There are two conductors I and II provided with solenoids M, $M^1$, $M^2$. The core of the solenoid M is connected with the arm $f^2$ of the valve or cock $f$ and bears a weight G. The core of the solenoid $M^2$ is connected with the arm $z$ of the cock $p$ and bears a weight $G^2$ and the core of the solenoid $M^1$ is connected with the arm $j$ of the connection cock $i$ and bears a weight $G^1$. The stem $m^1$ of the float $m$ coöperates with two contacts $K^1$ and $K^2$ to the first of which a branch conductor $E^1$ is led and to the latter a branch conductor $E^2$. The contact $K^1$ is preferably of the form shown in detail, on an enlarged scale, in Fig. 4 and consists of two parts, an arm $K^{11}$ and a counter-contact $K^{12}$ the latter being a piston resting on a spring $K^{13}$ in a tube $K^{14}$ supported, for instance, by the tank $k$. The arm $K^{11}$ is fastened to the stem $m^1$ of the float $m$. The contact $K^2$ is preferably made as shown in Fig. 5, comprising a lug $K^{20}$ pivotally connected with the stem $m^1$ of the float $m$. The lug $K^{20}$ is normally pulled down by a spring $K^{21}$. The tank $k$ bears an upright $K^{22}$ which in its lower part at $K^{23}$ is curved. The uptake bears a slide $K^{24}$ which is normally drawn upward by a spring $K^{25}$ and in its highest position is arrested by a pin or the like $K^{26}$ on the upright $K^{22}$. The slide $K^{24}$ bears a lug $K^{27}$ resting on a spring $K^{28}$. The lugs $K^{20}$ and $K^{27}$ are connected with the electric circuit. When the float $s$ sinks a contact switch K is actuated to close a circuit including the solenoid M, conductors I, $E^1$ and contact $K^{11}$, $K^{12}$. This contact is maintained closed by action of the spring $K^{13}$ throughout a considerable movement of the float $m$. The core of the solenoid M lifts the arm $f^2$ and opens the cock $f$. The water begins to flow out of the tank $a$. The cock $p$ for the influx of water into the tank $k$ is still open while the cock $i$ between the tanks $k$ and $a$ is closed. The water in the tank $k$ still rises until the float $m$ reaches its highest position. The contact $K^1$ is opened, the arm $K^{11}$ leaving the piston $K^{12}$. The connection between conductor I, and conductor $E^1$ is interrupted and the cock $f$ is closed by means of weight G. Instead of using the arrangement shown in Fig. 4, a sliding contact might also be used. The contact $K^2$ (consisting of the members $K^{20}$, $K^{27}$) is closed when the float $m$ is in its highest position which establishes a circuit through the battery S, conductor II, solenoids $M^1$, $M^2$, conductors $E^2$ and I. The solenoids $M^1$, $M^2$, being energized the cork $i$ is opened and the cock $p$ in the pipe $r$ is closed. When the water in the tank $k$ sinks the float $m$ follows and holds the contact $K^2$ closed until the slide $K^{24}$ reaches the curve $K^{23}$ of its guide and the member $K^{20}$ passes from contact with the member $K^{27}$. When the float $m$ has reached its lowest position the contact $K^2$ being open as described, the solenoids $M^1$ and $M^2$ are deënergized and the weights $G^1$, $G^2$ turn the cocks $i$ and $p$. Cock $i$ is closed, cock $p$ is opened. When the members $K^{20}$, $K^{27}$ are separated the slide $K^{26}$ is at once returned to its elevated position by the spring $K^{25}$. The contact $K^2$ might be arranged as shown in Fig. 4. The principle of the construction is, that when the float $m$ sinks, the solenoids $M^1$, $M^2$ have to be furnished with current while when the float $m$ rises, the solenoids $M^1$ and $M^2$ must be without current. Short time before the float $m$ has reached its highest position the lug $K^{20}$ abuts against the lug $K^{27}$ so that the lug $K^{20}$ jumps over the lug $K^{27}$ as shown in Fig. 5.

During the time the float $m$ rises there is no electric contact between the lugs $K^{20}$ and $K^{27}$.

It is evident that instead of using the construction shown in Fig. 5 a sliding contact may be used. The slide $K^{24}$ glides in a dove-tailed groove $K^{30}$ of the uptake $K^{22}$.

I claim:—

1. In an apparatus for purifying water having an upper and a lower tank with a communication between them, means depending upon the level of the water in the upper tank by which communication between the tanks is regulated, means for regulating the outlet from the lower tank arranged to be automatically operated before the level of the water in the upper tank has reached its highest position, and a heating arrangement for the contents of the lower tank.

2. In an apparatus for purifying water having an upper and a lower tank with a communication between the tanks, a float regulating communication between the tanks, a float in the upper tank for regulating the outlet of the lower tank, and means arresting upward movement of the last said float before the level of the water has reached its highest position, said float having means whereby it will fill with water when arrested and be emptied when the water in the tank falls to a certain level, means for heating the water in the lower tank, and a float in the lower tank connected with means for starting and stopping the heating device.

3. In an apparatus for purifying water having an upper and a lower tank with a communication between them, a float regulating the communication between the tanks, a float in the upper tank for regulating the outlet of the lower tank, said float having an inlet in its upper part and a siphon for emptying it when sunk down, and a stop for limiting upward movement of said float.

4. In an apparatus for purifying water having an upper and a lower tank with a communication between them, a float regulating communication between the tanks and connected with the outlet of the lower tank for closing it when said float has reached its lowest position, a second float in the upper tank also connected with the outlet of the tank and having an inlet opening in lower tank and having an inlet opening in its upper part and a siphon for emptying the second float when the water in the upper tank has sunk to a predetermined level.

5. In an apparatus for purifying water having an upper and a lower tank with a communication between them, a float regulating communication between the tanks, a float in the upper tank for regulating the outlet of the lower tank said float having means for permitting it to fill and sink after having been raised to a predetermined level and means for emptying it in its lowest position, an electric battery, conductors and solenoids connected with the water regulating device, and contacts actuated by the floats for controlling circuits including the solenoids to control the operation of the water regulating devices.

In testimony whereof I affix my signature in presence of two witnesses.

ERNST CLAUSSEN. [L. S.]

Witnesses:
 HELEN NUFER,
 ALBERT NUFER.